United States Patent
Luo et al.

(10) Patent No.: US 11,819,957 B2
(45) Date of Patent: Nov. 21, 2023

(54) FE—NI BASED ALLOY WELDING WIRE FOR WELDING 800H ALLOY AND PREPARATION METHOD THEREOF AND METHOD FOR WELDING 800H ALLOY

(71) Applicant: Jiangsu University, Jiangsu (CN)

(72) Inventors: Rui Luo, Jiangsu (CN); Zhizhong Yuan, Jiangsu (CN); Xiaonong Cheng, Jiangsu (CN); Leli Chen, Jiangsu (CN); Tian Liu, Jiangsu (CN); Qi Zheng, Jiangsu (CN); Yun Cao, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 682 days.

(21) Appl. No.: 17/044,047

(22) PCT Filed: Jun. 3, 2020

(86) PCT No.: PCT/CN2020/094077
§ 371 (c)(1),
(2) Date: Sep. 30, 2020

(87) PCT Pub. No.: WO2020/248878
PCT Pub. Date: Dec. 17, 2020

(65) Prior Publication Data
US 2023/0150070 A1    May 18, 2023

(30) Foreign Application Priority Data
Jun. 13, 2019 (CN) .......................... 201910509684.0

(51) Int. Cl.
B23K 35/30       (2006.01)
B23K 35/02       (2006.01)
(Continued)

(52) U.S. Cl.
CPC ...... B23K 35/3066 (2013.01); B23K 35/0261 (2013.01); B23K 35/40 (2013.01);
(Continued)

(58) Field of Classification Search
CPC ........... B23K 35/0255; B23K 35/0261; B23K 35/0266; B23K 35/30; B23K 35/3026;
(Continued)

(56) References Cited

U.S. PATENT DOCUMENTS 9,821,401 B2 * 11/2017 Fairchild .............. B23K 33/004
10,799,974 B2 * 10/2020 Zaddach ............ B23K 35/0255
(Continued)

FOREIGN PATENT DOCUMENTS

| CN | 101605628 A | 12/2009 |
|---|---|---|
| CN | 105312793 A | 2/2016 |

(Continued)

*Primary Examiner* — Hung D Nguyen
(74) *Attorney, Agent, or Firm* — TAROLLI, SUNDHEIM, COVELL & TUMMINO L.L.P.

(57) ABSTRACT

The present disclosure belongs to the technical field of welding materials, and in particular relates to a Fe—Ni based alloy welding wire for welding 800H alloy and a preparation method thereof and a method for welding 800H alloy. The Fe—Ni based alloy welding wire for welding 800H alloy provided by the present disclosure has a reasonable chemical components, and after being used to weld 800H alloy, the obtained weld has a tensile strength of 557.6 MPa and an elongation of 37.5% at ambient temperature, and has a tensile strength of 420 MPa and an elongation of 17.25% at a temperature of 650° C.

20 Claims, 3 Drawing Sheets

(51) Int. Cl.
| | |
|---|---|
| *B23K 35/40* | (2006.01) |
| *C21D 7/13* | (2006.01) |
| *C22C 33/04* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/44* | (2006.01) |
| *C22C 38/48* | (2006.01) |
| *C22C 38/54* | (2006.01) |
| *B23K 103/00* | (2006.01) |
| *B23K 103/04* | (2006.01) |
| *B23K 9/167* | (2006.01) |

(52) U.S. Cl.
CPC ............ *C21D 7/13* (2013.01); *C22C 33/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/44* (2013.01); *C22C 38/48* (2013.01); *C22C 38/54* (2013.01); *B23K 9/167* (2013.01); *B23K 2103/04* (2018.08); *B23K 2103/50* (2018.08)

(58) Field of Classification Search
CPC ............ B23K 35/3033; B23K 35/3053; B23K 35/3066; B23K 35/3073; B23K 35/308; B23K 35/3086; B23K 35/3093; B23K 35/34; B23K 35/3601; B23K 35/3602; B23K 35/3605; B23K 35/3607; B23K 35/3608; B23K 35/361; B23K 35/362; B23K 35/365; B23K 35/368; B23K 35/40; B23K 35/404; B23K 35/406; B23K 9/167; B23K 9/173; B23K 2103/04; B23K 2103/05; B23K 2103/50; C22C 38/00; C22C 38/001; C22C 38/002; C22C 38/02; C22C 38/04; C22C 38/06; C22C 38/08; C22C 38/12; C22C 38/14; C22C 38/22; C22C 38/24; C22C 38/26; C22C 38/28; C22C 38/30; C22C 38/34; C22C 38/38; C22C 38/40; C22C 38/42; C22C 38/44; C22C 38/46; C22C 38/48; C22C 38/50; C22C 38/52; C22C 38/54; C22C 38/58; C22C 33/04; C21D 6/004; C21D 7/13

See application file for complete search history.

(56) References Cited

U.S. PATENT DOCUMENTS

| | | | |
|---|---|---|---|
| 2002/0043305 A1* | 4/2002 | Fairchild | C22C 38/12 420/119 |
| 2005/0205525 A1* | 9/2005 | Barhorst | B23K 9/173 219/74 |
| 2014/0349136 A1* | 11/2014 | Barhorst | B23K 9/18 219/146.1 |
| 2015/0314397 A1* | 11/2015 | Jeong | B23K 35/30 219/146.23 |
| 2016/0129532 A1* | 5/2016 | Saruwatari | B23K 35/3607 219/74 |
| 2017/0096727 A1* | 4/2017 | Reydet | C22C 38/08 |
| 2018/0104773 A1* | 4/2018 | Miyata | C22C 38/002 |
| 2018/0339370 A1* | 11/2018 | Yamakami | B23K 35/30 |

FOREIGN PATENT DOCUMENTS

| | | |
|---|---|---|
| CN | 105397331 A | 3/2016 |
| CN | 108581141 A | 9/2018 |
| CN | 110280923 A | 9/2019 |
| JP | S60254207 A | 12/1985 |
| JP | H0711664 B2 | 2/1995 |

* cited by examiner

FE—NI BASED ALLOY WELDING WIRE FOR WELDING 800H ALLOY AND PREPARATION METHOD THEREOF AND METHOD FOR WELDING 800H ALLOY

CROSS REFERENCE TO RELATED APPLICATION

The present invention is a U.S. National Stage under 35 USC 371 patent application, claiming priority to Serial No. PCT/CN2020/094077, filed on 3 Jun. 2020; which claims priority of CN 201910509684.0, filed on 13 Jun. 2019, the entirety of both of which are incorporated herein by reference.

TECHNICAL FIELD

The present disclosure belongs to the technical field of welding materials, and in particular relates to a Fe—Ni based alloy welding wire for welding 800H alloy and a preparation method thereof and a method for welding 800H alloy.

BACKGROUND

The heat transfer tube of a steam generator is one of the key components in a nuclear power unit. At present, the heat transfer tube of a steam generator at home and abroad is mostly made of Fe—Cr—Ni alloy (800H alloy). 800H alloy is widely used in the manufacture of the heat transfer tube of a steam generator due to its high creep/fracture strength and high temperature corrosion resistance. However, the 800H heat transfer tube has a problem of early failure of welded joints during service, which brings a huge hidden danger to the long-term safe and stable operation of an unit.

The key to solve the problem of early failure of welded joints is to develop a suitable welding wire. At present, the welding wire used for welding 800H alloy is Inconel 82 welding wire. Although the welded joint formed by welding with this welding wire has a relatively high tensile strength at ambient temperature, it will reduce after being used at a high temperature, which will bury a hidden danger to the safe operation of a nuclear power unit.

SUMMARY

An object of the present disclosure is to provide a Fe—Ni based alloy welding wire for welding 800H alloy. The Fe—Ni based alloy welding wire has reasonable components, and when used as a filler wire for welding 800H alloy, welded joints with higher tensile strength and elongation at high temperature could be obtained.

In order to achieve the above object, the present disclosure provides the following technical solutions:

The present disclosure provides a Fe—Ni based alloy welding wire for welding 800H alloy, comprising the following chemical components in percentage by mass:
C: 0.05-0.10%, Si: ≤1.0%, Mn: ≤1.5%, Ni: 29.0-32.0%, Cr: 17.0-19.0%, Nb: 0.35-0.45%, Mo: 1.50-2.50%, Al: 2.5-3.0%, N: ≤0.03%, B: ≤0.01%, S: 0.002-0.008%, P: 0.008-0.009%, and the balance Fe.

In some embodiments, the Fe—Ni based alloy welding wire for welding 800H alloy comprises the following chemical components in percentage by mass:
C: 0.055-0.095%, Si: 0.1-0.8%, Mn: 0.1-1.2%, Ni: 29.0-32.0%, Cr: 17.0-19.0%, Nb: 0.35-0.45%, Mo: 1.50-2.50%, Al: 2.5-3.0%, N: 0.01-0.025%, B: 0.001-0.009%, S: 0.0020-0.008%, P: 0.008-0.009%, and the balance Fe.

In some embodiments, the Fe—Ni based alloy welding wire has a diameter of 1.0-1.5 mm.

The present disclosure further provides a preparation method of the Fe—Ni based alloy welding wire for welding 800H alloy described in the above technical solutions, comprising the following steps:
mixing raw materials according to the chemical components of the Fe—Ni based alloy welding wire described in the above technical solutions, and then subjecting the resulting raw material mixture in sequence to a vacuum melting, a casting, a forging, a hot rolling and a drawing, to obtain a Fe—Ni based alloy welding wire.

In some embodiments, the forging is a hot forging with an initial forging temperature of 930-1070° C. and a final forging temperature of 800-880° C.

In some embodiments, the hot rolling is carried out at a temperature of 1150-1200° C. with a rolling speed of 61-91 mm/min, and a deformation for each rolling of 8-12%.

The present disclosure further provides a method for welding 800H alloy, comprising: performing an argon tungsten-arc welding on 800H alloy by using a Fe—Ni based alloy welding wire,
wherein the Fe—Ni based alloy welding wire is the Fe—Ni based alloy welding wire for welding 800H alloy described in the above technical solutions or the Fe—Ni based alloy welding wire for welding 800H alloy obtained by the preparation methods described in the above technical solutions.

In some embodiments, the argon tungsten-arc welding is carried out under the following conditions:
a welding current of 110-120 A;
a welding voltage of 12 V;
a welding speed of 105-115 mm/min; and
an argon flow of 8-10 L/min.

In some embodiments, the welding thickness when welding 800H alloy is not larger than 2.5 mm.

In some embodiments, the 800H alloy is in a form of a heat transfer tube of a nuclear power steam generator.

The Fe—Ni based alloy welding wire for welding 800H alloy provided by the present disclosure has a reasonable chemical components and a better compatibility with 800H alloy, and a weld with better tensile strength and elongation could be obtained when using the Fe—Ni based alloy welding wire; when the welded workpiece is operated at a high temperature, due to the fact that the alloy components at the welded joint are fused with each other, the tensile strength and elongation of the weld can still be maintained at a relatively high level, which well solves the problem of early failure of the 800H alloy welded joint. The results of the examples show that after welding 800H alloy with the Fe—Ni based alloy welding wire provided by the present disclosure, the obtained weld has a tensile strength of 557.6 MPa and an elongation of 37.5% at ambient temperature, and has a tensile strength of 420 MPa and an elongation of 17.25% at 650° C. The tensile performance of the welded joint at high temperature is better than that of the existing 800H base metal welding wire (with a tensile strength of 394.5 MPa and an elongation of 15.5%) and of the existing Inconel 82 welding wire (with a tensile strength of 392 MPa and an elongation of 16.5%), which is beneficial to the safe operation of a nuclear power unit.

DETAILED DESCRIPTION

Figure 1:
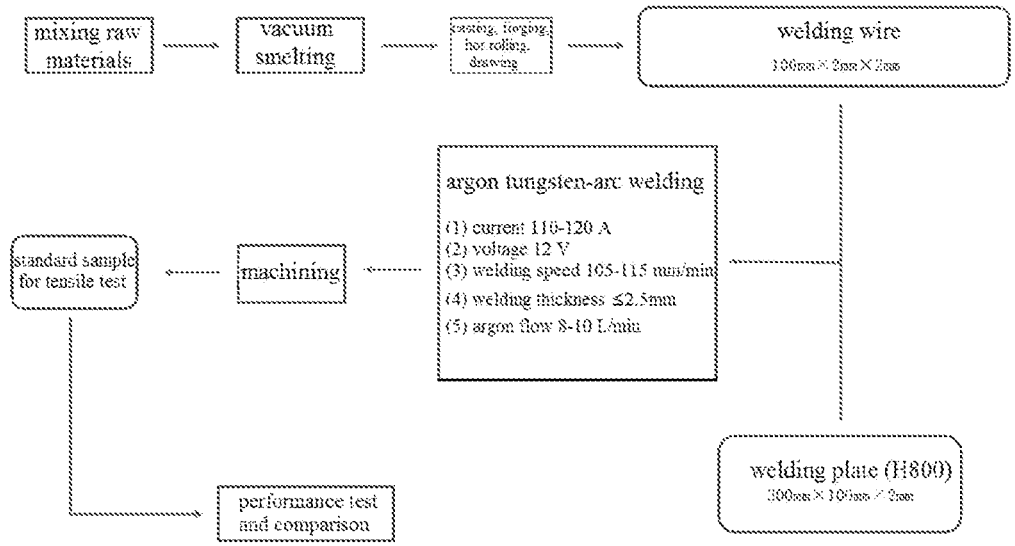
FIG. 1 is a flow schematic diagram of the preparation and performance test of the Fe—Si based alloy welding wire provided by the present disclosure.

The present disclosure provides a Fe—Ni based alloy welding wire for welding 800H alloy, comprising the following chemical components in percentage by mass:

C: 0.05-0.10%, Si: ≤1.0%, Mn: ≤1.5%, Ni: 29.0-32.0%, Cr: 17.0-19.0%, Nb: 0.35-0.45%, Mo: 1.50-2.50%, Al: 2.5-3.0%, N: ≤0.03%, B: ≤0.01%, S: 0.002-0.008%, P: 0.008-0.009%, and the balance Fe.

The Fe—Ni based alloy welding wire provided by the present disclosure comprises the following chemical components in percentage by mass:

C: 0.05-0.10%, preferably 0.055-0.095%, more preferably 0.060-0.085%, and further more preferably 0.065-0.080%;

Si: ≤1.0%, preferably 0.1-0.8%, more preferably 0.3-0.7%, and further more preferably 0.4-0.6%;

Mn: ≤1.5%, preferably 0.1-1.2%, more preferably 0.35-1.0%, and further more preferably 0.4-0.85%;

Ni: 29.0-32.0%, preferably 29.2-31.5%, more preferably 29.5-31.0%, and further more preferably 29.6-30.7%;

Cr: 17.0-19.0%, preferably 17.2-18.7%, more preferably 17.5-18.5%, and further more preferably 17.7-18.0%;

Nb: 0.35-0.45%, preferably 0.36-0.42%, more preferably 0.37-0.41%, and further more preferably 0.375-0.40%;

Mo: 1.50-2.50%, preferably 1.55-2.30%, more preferably 1.40-2.25%, and further more preferably 1.45-2.20%;

Al: 2.5-3.0%, preferably 2.55-2.9%, more preferably 2.60-2.87%, and further more preferably 2.63-2.85%;

N: ≤0.03%, preferably 0.01-0.025%, more preferably 0.012-0.020%, and further more preferably 0.015-0.018%;

B: ≤0.01%, preferably 0.001-0.009%, more preferably 0.002-0.008%, and further more preferably 0.003-0.0086%;

S: 0.002-0.008%, preferably 0.0021-0.007%, more preferably 0.0022-0.006%, and further more preferably 0.0025-0.005%;

P: 0.008-0.009%, preferably 0.0081-0.0089%, more preferably 0.0082-0.0088%, and further more preferably 0.0082-0.0087%;

furthermore, wherein the mass ratio of C to Nb is preferably 0.12-0.28:1, and more preferably 0.15-0.25:1;

in addition to the above components, the welding wire further comprises Fe, and the sum of the content of Fe and the above components is 100%.

The Fe—Ni-based alloy welding wire provided by the present disclosure has a reasonable chemical components, and the following effects exist among the components: Al element added can form a dense $Al_2O_3$ protective film at the weld of a heat transfer tube, but Al is a strong ferrite-stabilizing element, and in order to ensure a single-phase austenite structure of the welding wire, Ni and Nb elements are used in combination with Al element to reduce the ferrite region in phase diagram, so as to avoid the heat transfer tube from generating high temperature ferrite during service, thereby ensuring the formation of a stable $Al_2O_3$ protective film; Nb element can effectively reduce the susceptibility to intergranular attack in the heat transfer tube, but a too high content of Nb will make the smelting of the heat transfer tube more difficult, so that the content of Nb needs to be controlled within the range of the present disclosure; Nb element can combine with C element to form MC-type carbides, thereby achieving precipitation strengthening, and therefore, according to the present disclosure, the content of Nb element and the content of C element are controlled within the above range to exert the strengthening effect of Nb; according to the present disclosure, the content of Mo element is increased, which is beneficial to improve the creep resistance of the material, but in the long-term aging treatment, Mo element would promote the precipitation of intermetallic compounds, and according to the present disclosure, the precipitation of intermetallic compounds is inhibited by controlling the content of Ni element. The welding wire provided by the present disclosure has a good fusion with 800H alloy, so that it is suitable for welding 800H alloy.

The present disclosure further provides a preparation method of the Fe—Ni based alloy welding wire for welding 800H alloy described in the above technical solutions, comprising the following steps:

mixing raw materials according to the chemical components of the Fe—Ni based alloy welding wire described in the above technical solutions, and then subjecting the resulting raw material mixture in sequence to a vacuum melting, a casting, a forging, a hot rolling and a drawing, to obtain a Fe—Ni based alloy welding wire.

According to the present disclosure, there is no special requirements for the source of the raw materials corresponding to each chemical component in the Fe—Ni-based alloy welding wire described in the above technical solutions. It is possible to use any raw material known to those skilled in the art. It should be noted that S, P and N elements are impurity elements in the raw material corresponding to the Fe component, without additional addition.

According to the present disclosure, after the raw materials are mixed, the resulting raw material mixture is subjected to a vacuum melting, to obtain a alloy liquid suitable for casting. In some embodiments, the vacuum melting is carried out at a vacuum degree of 0.1-1 Pa; the vacuum melting is carried out at a temperature of 1580-1620° C., and preferably 1580-1610° C.; the vacuum melting is carried out for 60-90 min, and preferably 75-85 min.

According to the present disclosure, after obtaining a alloy liquid, the alloy liquid is subjected to a casting. In some embodiments, the casting is an ingot casting. In the specific implementation of the present disclosure, the casting is preferably performed in a cylindrical mold with an outer diameter of 30 cm, an inner diameter of 20 cm and a depth of 35 cm, to obtain an alloy ingot, which is convenient for the subsequent forging, hot rolling and drawing.

According to the present disclosure, after obtaining an alloy ingot, the alloy ingot is subjected to a forging to obtain a forged material. In some embodiments, the forging is a hot forging; the hot forging is preferably carried out with an initial forging temperature of 930-1070° C., and more preferably 950-1050° C.; the hot forging is preferably carried out with a final forging temperature of 800-880° C., and more preferably 810-850° C. According to the present disclosure, the alloy ingot is subjected to a hot forging and cogging in the above manner, so as to provide a needed material for the subsequent hot rolling.

According to the present disclosure, after obtaining a forged material, the forged material is subjected to a hot rolling to obtain a welding wire rod. In some embodiments, the forged material is subjected to a hot rolling at a temperature of 1150-1200° C., preferably 1165-1195° C., and more preferably 1175-1185° C. In some embodiments, the hot rolling is carried out with a rolling reduction for each rolling of 8-12%, and preferably 10%. In some embodiments, the hot rolling is carried out at a rolling speed of 61-91 mm/min, and preferably 65-85 mm/min. In some embodiments, the hot rolling is carried out for multiple times to obtain a welding wire rod. In some embodiments, the forged material is heated during the rolling, so that the forged material can be kept at a temperature within the above range. According to the present disclosure, there is no special requirements for the number of hot rolling, as long as a welding wire rod with a diameter of 5.5 mm could be obtained.

In some embodiments, after the hot rolling, the welding wire rod is cooled to ambient temperature by natural cooling for the next treatment.

According to the present disclosure, after obtaining a welding wire rod, the welding wire rod is subjected to a drawing to obtain a Fe—Ni based alloy welding wire for welding 800H alloy. In some embodiments, the Fe—Ni based alloy welding wire has a diameter of 1.0-1.5 mm, and preferably 1.2 mm. In some embodiments, the process of drawing the welding wire rod to a welding wire comprises two stages of a rough drawing and a fine drawing, wherein the rough drawing is to draw the welding wire rod to a welding wire rod with a diameter of 2.2 mm, and the fine drawing is to draw the welding wire rod with a diameter of 2.2 mm to a Fe—Ni based alloy welding wire with a diameter of 1.2 mm. In some embodiments, the drawing is performed in a pressure die. In some embodiments, the welding wire is pickled before the drawing; it is possible to use any method of pickling known to those skilled in the art, as long as the oxide layer and impurities on the surface of the welding wire rod could be removed.

According to the present disclosure, there is no special requirements for the detailed operation process of the drawing, so long as the welding wire with the above diameter could be obtained.

The present disclosure further provides a method for welding 800H alloy, comprising: performing an argon tungsten-arc welding on 800H alloy by using a Fe—Ni based alloy welding wire, wherein the Fe—Ni based alloy welding wire is the Fe—Ni based alloy welding wire for welding 800H alloy described in the above technical solutions or the Fe—Ni based alloy welding wire for welding 800H alloy obtained by the preparation methods described in the above technical solutions.

The welding method provided by the present disclosure is directed to 800H alloy. The 800H alloy may be in the form of a tube, a bar or a plate, specifically a heat transfer tube of a nuclear power steam generator. According to the present disclosure, there is no special requirements for the specific source of the 800H alloy, and it is possible to use any 800H alloy required to be welded.

In some embodiments, the method for welding 800H alloy is an argon tungsten-arc welding; the welding process of the argon tungsten-arc welding is preferably controlled under the following conditions:

a welding current of 110-120 A, preferably 112-118 A, and more preferably 113-117 A;

a welding voltage of 12 V;

a welding speed of 105-115 mm/min, preferably 107-113 mm/min, and more preferably 108-112 mm/min;

an argon flow of 8-10 L/min, preferably 8.5-9.5 L/min, and more preferably 9 L/min; and a welding thickness of not larger than 2.5 mm, preferably 0.5-2.3 mm, and more preferably 1-2.2 mm.

In order to further illustrate the present disclosure, the Fe—Ni based alloy welding wire for welding 800H alloy and the preparation method thereof and the method for welding 800H alloy provided by the present disclosure will be described in detail with reference to the accompanying drawings and examples, but they cannot be understood to limit the protection scope of the present disclosure.

Example 1

The experiment was carried out according to the flow schematic diagram shown in FIG. 1:

the raw materials were mixed according to the chemical components shown in Table 1, and the resulting raw material mixture was subjected to a vacuum melting in a vacuum induction melting furnace (ZG-0.05) at a vacuum degree of 1 Pa and a temperature of 1590° C., and then subjected to a casting. The obtained alloy ingot was then in sequence subjected to a forging, a hot rolling and a drawing, wherein the process parameters of the forging and the hot rolling were shown in Table 2, and a Fe—Ni based alloy welding wire with a diameter of 1.2 mm was obtained for use.

An argon tungsten-arc welding was performed on a 800H alloy plate (300 mm×100 mm×2 mm) by using the above Fe—Ni based alloy welding wire as a filler wire, and the process parameters of the welding were shown in Table 3.

Examples 2-5

According to the method of Example 1, Fe—Ni based alloy welding wires were prepared and argon tungsten-arc weldings were performed. The chemical components of the welding wire, the preparation conditions and the process parameters of the welding were shown in Tables 1-3 respectively.

Comparative Example 1

An argon tungsten-arc welding was performed according to the method described in Example 1 by using a 800H alloy as a welding wire.

Comparative Example 2

An argon tungsten-arc welding was performed according to the method described in Example 1 by using a commercial Inconel 82 alloy as a welding wire.

TABLE 1

The chemical components (%, mass percentage) of the Fe—Ni based alloy welding wires prepared in Examples 1-5.

| Element | Example 1 | Example 2 | Example 3 | Example 4 | Example 5 |
|---|---|---|---|---|---|
| C | 0.077 | 0.077 | 0.082 | 0.082 | 0.087 |
| Si | 0.47 | 0.47 | 0.45 | 0.45 | 0.43 |
| Mn | 0.83 | 0.81 | 0.83 | 0.84 | 0.83 |
| Ni | 29.73 | 29.75 | 29.76 | 29.72 | 29.73 |
| Cr | 17.84 | 17.84 | 17.82 | 17.84 | 17.85 |
| Nb | 0.39 | 0.37 | 0.38 | 0.40 | 0.41 |
| Mo | 2.03 | 2.01 | 2.03 | 2.05 | 2.05 |
| Al | 2.73 | 2.65 | 2.69 | 2.86 | 2.92 |
| N | 0.016 | 0.016 | 0.016 | 0.016 | 0.016 |
| B | 0.0086 | 0.0086 | 0.0086 | 0.0086 | 0.0086 |
| S | 0.0029 | 0.0029 | 0.0029 | 0.0029 | 0.0029 |
| P | 0.0082 | 0.0082 | 0.0082 | 0.0082 | 0.0082 |
| Fe | balance | balance | balance | balance | balance |

TABLE 2

The process parameters of the preparations of the Fe—Ni based alloy welding wires in Examples 1-5.

| Forging | Example 1 | Example 2 | Example 3 | Example 4 | Example 5 |
|---|---|---|---|---|---|
| Initial forging temperature (° C.) | 950 | 975 | 1000 | 1025 | 1050 |
| Final forging temperature (° C.) | 810 | 820 | 830 | 840 | 850 |
| Hot rolling temperature (° C.) | 1175 | 1180 | 1185 | 1200 | 1150 |
| Rolling reduction for each rolling (%) | 10 | 10 | 9 | 11 | 12 |
| Rolling speed (mm/min) | 70 | 80 | 90 | 65 | 75 |

TABLE 3

The process parameters of weldings in Examples 1-5 and Comparative Examples 1-2.

| Welding parameters | Example 1 | Example 2 | Example 3 | Example 4 | Example 5 | Comparative Example 1 | Comparative Example2 |
|---|---|---|---|---|---|---|---|
| Voltage (V) | 12 | 12 | 12 | 12 | 12 | 12 | 12 |
| Current (A) | 115 | 115 | 110 | 110 | 120 | 115 | 115 |
| Welding speed (mm/min) | 110 | 105 | 110 | 105 | 110 | 110 | 110 |
| Ar flow (L/min) | 9 | 9 | 9 | 9 | 9 | 9 | 9 |
| Welding thickness (mm) | 2.5 | 2.4 | 2.2 | 2.3 | 2.5 | 2.1 | 2.1 |

TABLE 4

The test results of the mechanical properties of the welded joints obtained in Examples 1-5 and Comparative Examples 1-2.

| Welding wire sample | Tensile performance at ambient temperature | | Tensile performance at high temperature (650° C.) | |
|---|---|---|---|---|
| | Average tensile strength MPa | Average elongation % | Average tensile strength MPa | Average elongation % |
| 800H base metal welding wire | 565 | 31.75 | 394.5 | 15.5 |
| Inconel 82 welding wire | 560 | 35.2 | 392 | 16.5 |
| Example 1 | 557.6 | 37.5 | 420.5 | 17.25 |
| Example 2 | 557.8 | 37.5 | 422.3 | 17.32 |
| Example 3 | 556.9 | 36.2 | 421.5 | 17.27 |
| Example 4 | 557.2 | 37.4 | 422.4 | 17.15 |
| Example 5 | 557.5 | 36.5 | 423.5 | 17.14 |

From the test results shown in Table 4, it can be seen that compared with Comparative Example 1 (800H base metal welding wire) and Comparative Example 2 (Inconel 82 welding wire), the welded joint formed from the welding wire provided by the present disclosure has a slightly reduced tensile strength and a significantly increased elongation at ambient temperature, while at high temperature (650° C.), it has a significant advantage on the tensile performance, with a higher tensile strength and a higher elongation than those in Comparative Examples 1-2. The above results indicated that the welding wire provided by the present disclosure can replace 800H base metal welding wire or Inconel 82 welding wire.

Figure 2:
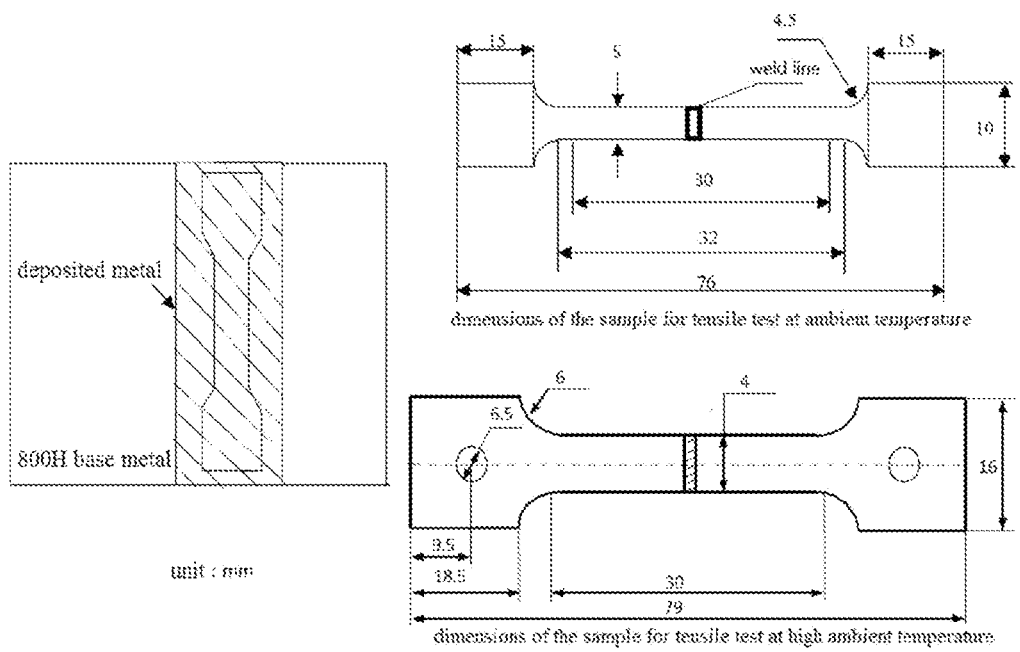
FIG. 2 is a schematic diagram of the structure and dimension of the sample required for the tensile test of the present disclosure.
Figure 3:
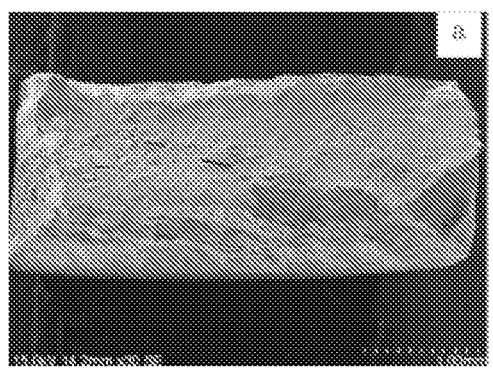
FIG. 3 is an SEM image of the overall view of the fracture obtained after the tensile test at ambient temperature in Example 1 of the present disclosure.
Figure 4:
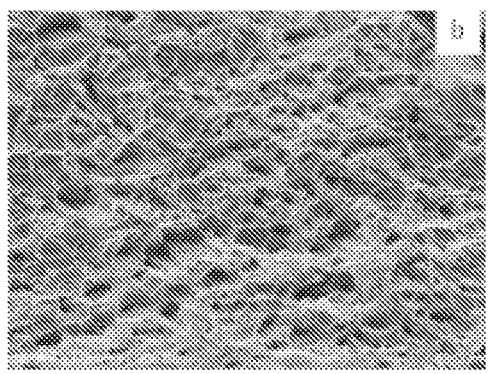
FIG. 4 is an SEM image of the fracture with a magnification obtained after the tensile test at ambient temperature in Example 1 of the present disclosure.
Figure 5:
FIG. 5 is an SEM image of the overall view of the fracture obtained after the tensile test at high temperature in Example 1 of the present disclosure.
Figure 6:
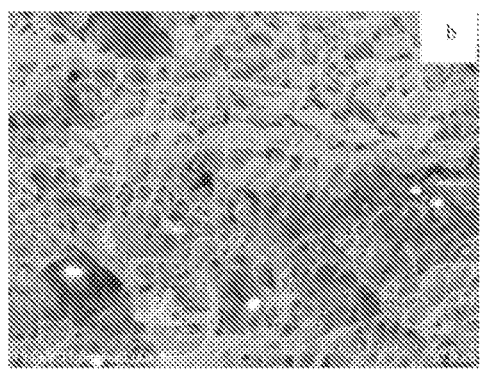
FIG. 6 is an SEM image of the fracture with a magnification obtained after the tensile test at high temperature in Example 1 of the present disclosure.

The fractures formed after the tensile test at ambient temperature and high temperature of the test sample obtained after the welding in Example 1 were characterized Performance Characterization and Results According to the schematic diagram shown in FIG. 2, the welded workpieces were machined to obtain samples for tensile performance testing. The test was carried out in accordance with "GBT228-2002 Metallic materials-Tensile testing at ambient temperature". The tensile performance of the welded workpieces were tested at ambient temperature and high temperature (650° C.) respectively, and the test results were shown in Table 4.

by a scanning electron microscope, and the results were shown in FIGS. 3-6, wherein FIG. 3 showed the overall view of the fracture obtained after the tensile test at ambient temperature, FIG. 4 was an enlarged view of the fracture obtained after the tensile test at ambient temperature, and the enlarged fracture showed dimple morphology, FIG. 5 showed the overall view of the fracture obtained after the tensile test at high temperature (650° C.), and FIG. 6 was an enlarged view of the fracture obtained after the tensile test at a high temperature (650° C.), and the enlarged fracture showed dimple morphology. It can be seen from the tensile test results that the fractures caused by the tensile test of the samples, which are obtained by welding the 800H alloy with the Fe—Ni based alloy welding wire provided by the present disclosure, are all ductile fractures, indicating that the welding wire provided by the present disclosure can effectively improve the mechanical performance of the weldments, which is of great significance for prolonging the service life of the heat transfer tubes of steam generators.

It can be seen from the above examples that the Fe—Ni based alloy welding wire provided by the present disclosure has reasonable components, and it is suitable for welding 800H alloy. The preparation method of the alloy welding wire is simple and easy to control, and therefore it is suitable for industrial popularization.

Although the above examples have described the present disclosure in detail, they are only part of the embodiments of the present disclosure, and not all of them. Those skilled in the art can also obtain other embodiments according to these examples without creative labour, and those belong to the protection scope of the present disclosure.

What is claimed is:

1. A Fe—Ni based alloy welding wire for welding 800H alloy, comprising the following chemical components in percentage by mass:
C: 0.05-0.10%,
Si: ≤1.0%,
Mn: ≤1.5%,
Ni: 29.0-32.0%,
Cr: 17.0-19.0%,
Nb: 0.35-0.45%,
Mo: 1.50-2.50%,
Al: 2.5-3.0%,
N: ≤0.03%,
B: ≤0.01%,
S: 0.002-0.008%,
P: 0.008-0.009%, and
the balance Fe.

2. The Fe—Ni based alloy welding wire as claimed in claim 1, wherein the Fe—Ni based alloy welding wire comprises the following chemical components in percentage by mass:
C: 0.055-0.095%,
Si: 0.1-0.8%,
Mn: 0.1-1.2%,
Ni: 29.0-32.0%,
Cr: 17.0-19.0%,
Nb: 0.35-0.45%,
Mo: 1.50-2.50%,
Al: 2.5-3.0%,
N: 0.01-0.025%,
B: 0.001-0.009%,
S: 0.0020-0.008%,
P: 0.008-0.009%, and
the balance Fe.

3. The Fe—Ni based alloy welding wire as claimed in claim 2, wherein the Fe—Ni based alloy welding wire has a diameter of 1.0-1.5 mm.

4. The Fe—Ni based alloy welding wire as claimed in claim 1, wherein the Fe—Ni based alloy welding wire has a diameter of 1.0-1.5 mm.

5. A preparation method of the Fe—Ni based alloy welding wire for welding 800H alloy as claimed in claim 1, comprising the following steps:
mixing raw materials according to the chemical components of the Fe—Ni based alloy welding wire as claimed in claim 1, and then subjecting the resulting raw material mixture in sequence to a vacuum melting, a casting, a forging, a hot rolling and a drawing, to obtain a Fe—Ni based alloy welding wire.

6. The preparation method as claimed in claim 5, wherein the Fe—Ni based alloy welding wire comprises the following chemical components in percentage by mass:
C: 0.055-0.095%,
Si: 0.1-0.8%,
Mn: 0.1-1.2%,
Ni: 29.0-32.0%,
Cr: 17.0-19.0%,
Nb: 0.35-0.45%,
Mo: 1.50-2.50%,
Al: 2.5-3.0%,
N: 0.01-0.025%,
B: 0.001-0.009%,
S: 0.0020-0.008%,
P: 0.008-0.009%, and
the balance Fe.

7. The preparation method as claimed in claim 5, wherein the Fe—Ni based alloy welding wire has a diameter of 1.0-1.5 mm.

8. The preparation method as claimed in claim 5, wherein the forging is a hot forging with an initial forging temperature of 930-1070° C. and a final forging temperature of 800-880° C.

9. The preparation method as claimed in claim 8, wherein the hot rolling is carried out at a temperature of 1150-1200° C. with a rolling speed of 61-91 mm/min.

10. The preparation method as claimed in claim 5, wherein the hot rolling is carried out at a temperature of 1150-1200° C. with a rolling speed of 61-91 mm/min.

11. A method for welding 800H alloy, comprising: performing an argon tungsten-arc welding on 800H alloy by using a Fe—Ni based alloy welding wire,
wherein the Fe—Ni based alloy welding wire is the Fe—Ni based alloy welding wire for welding 800H alloy as claimed in claim 1.

12. The method as claimed in claim 11, wherein the argon tungsten-arc welding is carried out under the following conditions:
a welding current of 110-120 A;
a welding voltage of 12 V;
a welding speed of 105-115 mm/min; and
a argon flow of 8-10 L/min.

13. The method as claimed in claim 12, wherein the welding thickness when welding 800H alloy is not larger than 2.5 mm.

14. The method as claimed in claim 12, wherein the 800H alloy is in a form of a heat transfer tube of a nuclear power steam generator.

15. The method as claimed in claim 11, wherein the welding thickness when welding 800H alloy is not larger than 2.5 mm.

16. The method as claimed in claim 11, wherein the 800H alloy is in a form of a heat transfer tube of a nuclear power steam generator.

17. The method as claimed in claim 11, wherein the preparation method of the Fe—Ni based alloy welding wire for welding 800H alloy, comprising the following steps:
mixing raw materials according to the chemical components of the Fe—Ni based alloy welding wire, and then subjecting the resulting raw material mixture in sequence to a vacuum melting, a casting, a forging, a hot rolling and a drawing, to obtain a Fe—Ni based alloy welding wire.

18. The method as claimed in claim 11, wherein the forging is a hot forging with an initial forging temperature of 930-1070° C. and a final forging temperature of 800-880° C.

19. The method as claimed in claim 18, wherein the hot rolling is carried out at a temperature of 1150-1200° C. with a rolling speed of 61-91 mm/min.

20. The method as claimed in claim 11, wherein the hot rolling is carried out at a temperature of 1150-1200° C. with a rolling speed of 61-91 mm/min.

\* \* \* \* \*